(12) United States Patent
Lee et al.

(10) Patent No.: US 7,436,802 B2
(45) Date of Patent: Oct. 14, 2008

(54) FREQUENCY HOPPING METHOD IN ORTHOGONAL FREQUENCY DIVISION MULTIPLEXING SYSTEM

(75) Inventors: Heesoo Lee, Daejeon (KR); Kyung-Hi Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 291 days.

(21) Appl. No.: 10/540,740

(22) PCT Filed: Nov. 21, 2003

(86) PCT No.: PCT/KR03/02531

§ 371 (c)(1),
(2), (4) Date: Jan. 19, 2006

(87) PCT Pub. No.: WO2004/059897

PCT Pub. Date: Jul. 15, 2004

(65) Prior Publication Data

US 2006/0203707 A1    Sep. 14, 2006

(30) Foreign Application Priority Data

Dec. 24, 2002 (KR) ...................... 10-2002-0083723
May 23, 2003 (KR) ...................... 10-2003-0032934

(51) Int. Cl.
*G01R 31/08* (2006.01)
(52) U.S. Cl. ....................... 370/330; 370/319; 370/203; 370/210
(58) Field of Classification Search ................. 370/208, 370/203, 210
See application file for complete search history.

(56) References Cited

U.S. PATENT DOCUMENTS

| 5,410,538 A | 4/1995 | Roche et al. |
| 5,548,582 A | 8/1996 | Brajal et al. |
| 5,946,624 A * | 8/1999 | Petranovich et al. ........ 455/447 |

(Continued)

FOREIGN PATENT DOCUMENTS

EP    1043861    10/2000

(Continued)

OTHER PUBLICATIONS

Justin Chang et al; "Beyond 3G: Wideband Wireless Data Access Based on OFDM and Dynamic Packet Assignment" IEEE Communication Magazine, Jul. 2000.

(Continued)

*Primary Examiner*—Ricky Ngo
*Assistant Examiner*—Dewanda Samuel
(74) *Attorney, Agent, or Firm*—Ladas & Parry LLP

(57) ABSTRACT

Disclosed is a frequency hopping method in an OFDM system, comprising: (a) detecting a mutual interference degree between different cells, and determining whether to use different frequency hopping patterns between the cells for interference averaging according to the mutual interference degree interference degree; (b) determining a number P of the different frequency hopping patterns needed between all the cells in the system; (c) generating the frequency hopping patterns of more than the number P and allocating the generated frequency hopping patterns to each cell, the frequency hopping patterns having the same frequency collision times between two channels in the different frequency hopping patterns; and (d) frequency-hopping the channels in each cell according to the allocated frequency hopping pattern.

5 Claims, 12 Drawing Sheets

U.S. PATENT DOCUMENTS

| | | | |
|---|---|---|---|
| 6,088,416 A * | 7/2000 | Perahia et al. | 375/377 |
| 6,112,094 A | 8/2000 | Dent | |
| 6,154,654 A * | 11/2000 | Mao | 455/446 |
| 6,405,044 B1 * | 6/2002 | Smith et al. | 455/447 |
| 6,473,418 B1 | 10/2002 | Laroia et al. | |
| 7,010,304 B1 * | 3/2006 | Zhang et al. | 455/446 |
| 2002/0085641 A1 | 7/2002 | Baum | |

FOREIGN PATENT DOCUMENTS

EP          1043861 A1 *  10/2000

OTHER PUBLICATIONS

Gregory J. Pottie et al; "Channel Coding Strategies for Cellular Radio" IEEE Transactions on Vehicular Technology, vol. 44, No. 4, Nov. 1995.

Zoran Kostic et al; "Fundamentals of Dynamic Frequency Hopping in Cellular Systems" IEEE Journal on Selected Areas in Communications, vol. 19, No. 11, Nov. 2001.

* cited by examiner

Channel a
Channel b
Channel c
Channel d

Channel 0
Channel 1
Channel 2
Channel 3

FREQUENCY HOPPING METHOD IN ORTHOGONAL FREQUENCY DIVISION MULTIPLEXING SYSTEM

CROSS REFERENCE TO RELATED APPLICATION

This application claims priority to and the benefit of Korea Patent Applications No. 2002-83723 filed on Dec. 24, 2002 and No. 2003-32934 filed on May 23, 2003 in the Korean Intellectual Property Office, the content of which is incorporated herein by reference.

BACKGROUND OF THE INVENTION (a) Field of the Invention

The present invention relates to a frequency hopping method in a cellular mobile communication system using OFDM (orthogonal frequency division multiplexing). More specifically, the present invention relates to a frequency hopping method for providing the top performance of the OFDMA (orthogonal frequency division multiplexing access) system in the viewpoint of interference averaging, and a frequency hopping method in an OFDM system for providing a corresponding frequency hopping pattern designing method.

(b) Description of the Related Art

The OFDM method is a multi-carrier transmission technique for dividing all available bands into a plurality of narrow bands, modulating narrow-band subcarriers in parallel, and transmitting modulated subcarriers, and a small amount of low-rate data are allocated to the respective subcarriers.

Since the OFDM method uses orthogonal subcarriers, efficiency of frequency usage increases, and multi-path channels can be easily overcome by using a simple frequency domain equalizer with a single tap.

Also, since the OFDM method can be realized at high rates by using the FFT (fast Fourier transform), it is widely used as a transmission method for high-speed digital communication systems.

In particular, the OFDM method is applied to the mobile/wireless communication fields including WLAN, WMAN, and cellular mobile communication systems.

Cellular mobile communication systems based on OFDM are classified as OFDM-FDMA (OFDMA), OFDM-TDMA, and OFDM-CDMA according to multiple access methods of allocating wireless resources to a plurality of users.

Among them, the OFDMA method allocates part of the total subcarriers to each user to cover the plurality of users. To increase the frequency diversity gain and the frequency reuse rates, the OFDMA adopts frequency hopping for varying the allocated subcarrier groups with respect to time.

The frequency hopping in the OFDMA method is used together with channel encoding and interleaving to obtain a frequency diversity effect, as well as an interference averaging effect, the interference being provided from adjacent cells in the cellular environments.

FIGS. 1(a) and 1(b) show diagrams for describing the frequency hopping of subcarriers in the conventional OFDMA method.

Referring to FIG. 1(a), the vertical axis of the lattice is a frequency axis, and the horizontal axis is a time axis 10 representing a symbol period.

The reference numeral 11 on the frequency axis indicates a single subcarrier, the reference numeral 12 on the frequency axis shows a set of continuous subcarriers (i.e., a cluster) on the frequency axis, and the size is represented by multiplying the number of subcarriers in the lattice by a subcarrier frequency interval. The reference numeral 13 on the time axis is a unit for channel coding.

The frequency hopping OFDMA method on the cluster basis configures clusters, and randomly allocates the clusters for each symbol period on the basis of the configured clusters (that is, performs frequency hopping), thereby configuring a channel.

FIG. 1(a) shows that four adjacent subcarriers form a single cluster, showing an exemplified case of a four channel configuration format in the cell A, and FIG. 1(b) shows an exemplified case of a one channel configuration format in the cell B. It is assumed in FIGS. 1(a) and 1(b) that the cells A and B are adjacent or very near to each other.

As shown, the channel configurations of adjacent or near cells (the frequency hopping pattern) are to be different from each other so as to average the interference provided by the adjacent cells.

If two neighboring cells use the same hopping pattern, continuous and severe interference occurs between the identical channels. As to the channel a of the cell A and the channel e of the cell B, interference is generated for four symbol periods during 16 symbol periods that is a single channel coding period. That is, interference is not intensively generated to a single predetermined channel, but it is relatively generated to other channels (referred to as an interference averaging effect.)

As described above, the cells in a mobile communication network, based on the frequency hopping OFDMA, have their own specific hopping patterns, and the neighboring cells having different hopping patterns average the interference influencing the adjacent cells.

One of the conventional methods uses a pattern of pseudo random sequences for the above-noted frequency hopping pattern (a channel configuration format).

Degrees of interference that the channel e of the cell B imparts on the respective channels of the cell A will now be described when the frequency hopping pattern generated by the pseudo random sequences is created as shown in FIG. 1.

Interference occurs in the channels a and c of the cell A for four symbol periods, and the interference occurs in the channel b of the cell A for two symbol periods, thereby generating less interference. However, the interference occurs in the channel d for six symbol periods, thereby undergoing relatively very hard interference compared to the channels a, b, and c.

Frequent frequency collision between the specific channels arouses severe-interference to lower the system performance because of high BERs (bit error rates).

As shown, when sixteen subcarriers, four channels (a number of concurrent users), and a channel coding period of sixteen symbol intervals are provided, the case of inducing the interference to all the channels for four symbol periods is the best hopping pattern regarding the interference averaging.

Accordingly, the frequency hopping pattern made by the pseudo random sequences problematically fails to execute perfect interference averaging because the degrees of the interference influencing each other between the channels in the two adjacent cells are not uniform.

As to another conventional frequency hopping pattern designing method, a frequency hopping pattern designing method on the basis of the mutually orthogonal Latin square for overcoming the frequency hopping method on the basis of the above-noted pseudo random sequences will now be described.

The frequency hopping pattern designing method on the basis of the mutually orthogonal Latin square induces frequency collisions between all the channel pairs within two cells using different frequency hopping patterns the same number of times, thereby allowing obtaining of the complete interference averaging.

When the number of channels (the number of concurrent accessed users) is set as N in the frequency hopping pattern designing method on the basis of the mutually orthogonal Latin square, (N−1) different frequency hopping patterns for providing the complete interference averaging exist. When a mobile communication network includes a plurality of cells, it is necessarily required to reuse a frequency hopping pattern so as to allocate a single hopping pattern to each cell.

If the number N1 of the frequency hopping patterns is a big number, cells that are geographically distant to thereby generate much path loss and less interference with each other can be arranged so that the cells may use the identical hopping pattern.

If the number N1 of the frequency hopping patterns is a small number, arranging the same frequency hopping pattern between adjacent cells is unavoidable, which may give rise to severe interference between the users who use the same frequency hopping pattern, thereby severely lowering performance.

Therefore, while considering it very important to have a number of different frequency hopping patterns of more than a predetermined level, the above-noted method based on the mutually orthogonal Latin squares causes severe performance lowering when the number N of channels is small.

Further, the above-mentioned method provides a method for designing (N−1) mutually orthogonal Latin squares only when the number N of channels is a prime number or the square of a prime number. That is, the above-noted method on the basis of the mutually orthogonal Latin square cannot be applied to the case in which the number N has two or more prime numbers as divisors, such as 6, 10, 12, and 14.

Theoretically, when the number N of channels is six, no pairs of mutually orthogonal Latin squares exist. That is, if N=6, even two different orthogonal hopping patterns for enabling complete interference averaging cannot be made when following the above-noted method on the basis of the mutually orthogonal Latin square.

SUMMARY OF THE INVENTION

It is an advantage of the present invention to provide a frequency hopping method in an OFDM system for complete interference averaging differing from the frequency hopping patterns based on the pseudo random sequence.

It is an advantage of the present invention to provide a frequency hopping method in an OFDM system for designing a desired number of different frequency hopping patterns when the number of channels (i.e., the number N of concurrent users) is small, and achieving complete interference averaging when the number N of channels has two or more different prime numbers as divisors.

In one aspect of the present invention, a frequency hopping method in an OFDM system comprises:

(a) detecting a mutual interference degree between different cells, and determining whether to use different frequency hopping patterns between the cells for interference averaging according to the mutual interference degree;

(b) determining a number P of the different frequency hopping patterns needed for satisfying results of (a) between all the cells in the system;

(c) generating frequency hopping patterns of more than the number P determined in (b), and allocating the generated frequency hopping patterns to each cell so as to satisfy the results of (a), the frequency hopping patterns having the same frequency collision times between two channels in the different frequency hopping patterns; and (d) frequency-hopping the channels in each cell according to the frequency hopping pattern allocated in (c).

Generating the frequency hopping patterns in (c) comprises setting a cluster as a subcarrier to thereby generate the frequency hopping patterns, when the channel includes a cluster.

Different frequency hopping patterns of more than a number P are generated to execute frequency hopping when the number of channels is a prime number, when it is the square of a prime number, and when it has at least two different prime numbers as divisors.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The conventional cluster-based OFDM method configures a cluster, which is a group of adjacent subcarriers, to form a channel by allocating a different cluster for each symbol period using the cluster. In the preferred embodiment of the present invention, however, not the clusters but the subcarriers are used in forming the channel, and several subcarriers are allocated according to a specific pattern for each symbol period to thereby configure a channel.

Figure 2:
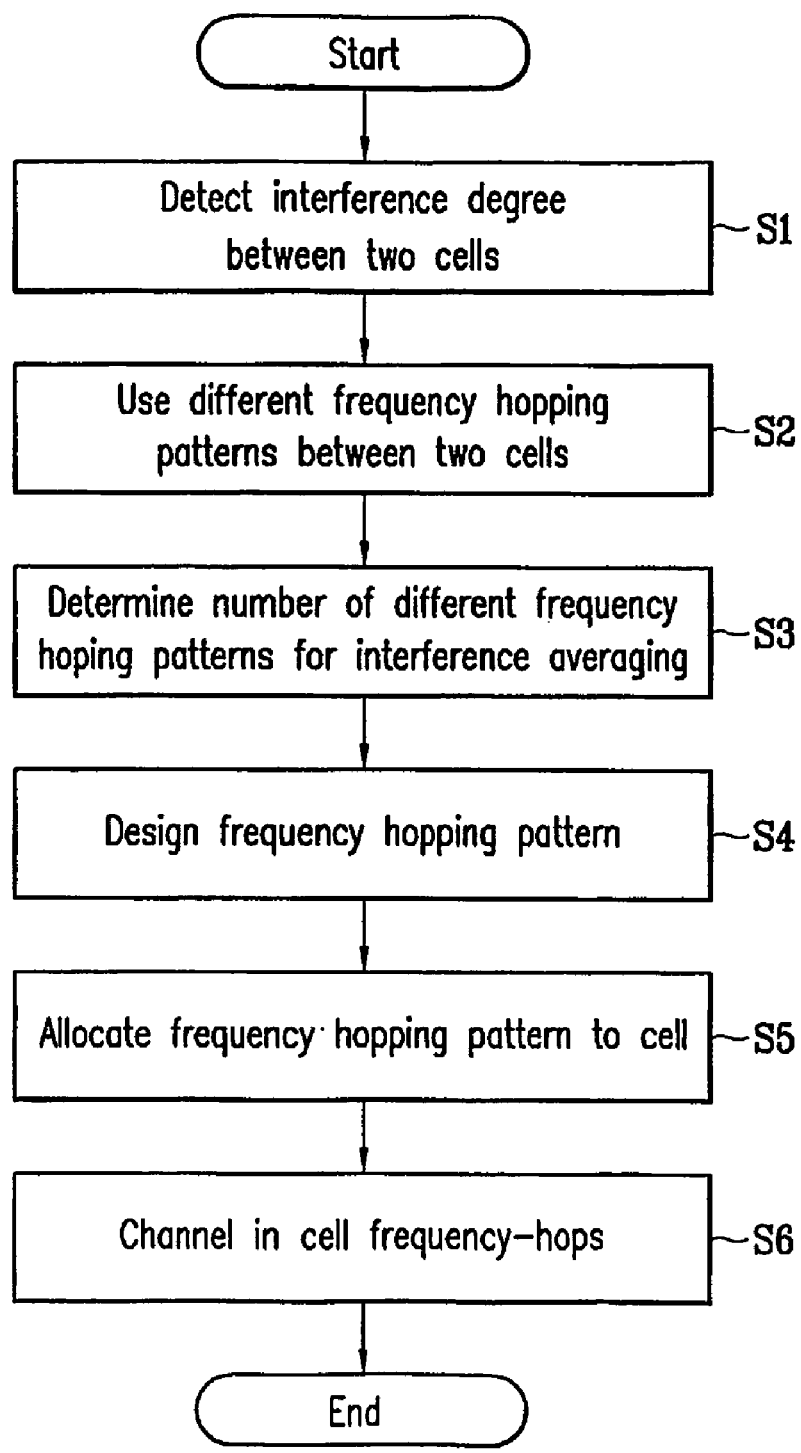
FIG. 2 shows a flowchart of a frequency hopping method in an OFDM system according to a preferred embodiment of the present invention.

FIG. 2 shows a flowchart of a frequency hopping method in an OFDM system according to a preferred embodiment of the present invention.

As shown, a degree of interference that two different cells give each other is detected in the OFDM system in step S1.

When the interference that the two cells give each other is heavy because of a short distance between the cells, it is determined whether to use different frequency hopping patterns depending on the interference degree between the cells since it is required to obtain interference averaging through the different frequency hopping patterns in step S2.

When the degree of interference that the two cells give each other is not so heavy because of long separation therebetween, the two cells may not use the different frequency hopping patterns.

After determining to use the different frequency hopping patterns between the two cells, the number P of the different frequency hopping patterns needed for the whole system is determined in step S3.

After this, at least P frequency hopping patterns are designed so that the frequency collision times between two channels in the different frequency hopping patterns may be identical in step S4.

When the above-designed frequency hopping patterns are allocated to the cells in step S5 so as to satisfy the previous step S2, all the downlink channels in each cell are frequency-hopped according to the allocated frequency hopping pattern in step S6.

Figure 3:
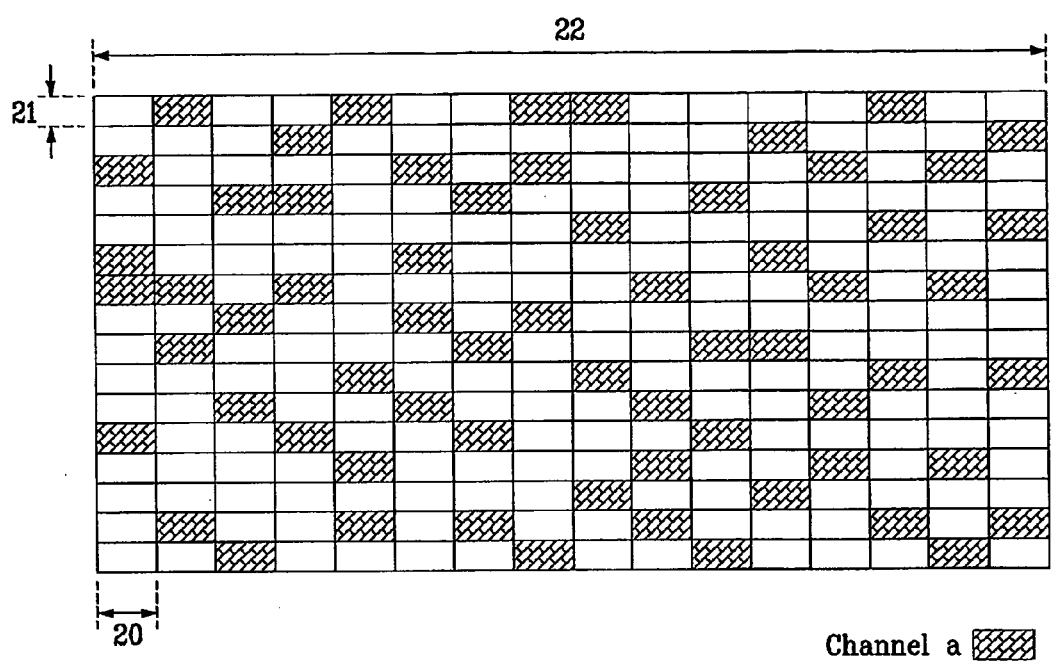
FIG. 3 shows an exemplified case of a channel layout for the frequency hopping method in an OFDM system according to a preferred embodiment of the present invention.

FIG. 3 shows an exemplified case of a channel layout for the frequency hopping method in an OFDM system according to a preferred embodiment of the present invention.

As shown, a single channel includes four subchannels, and the subchannels hop with respect to time.

The subchannels of each channel hop according to a predefined sequence, and the frequency hopping pattern represents the definition of the hopping sequences on all the channels within a specific cell.

Referring to FIG. 3, the reference numeral 21 on the vertical axis (the frequency axis) is a single subcarrier, the horizontal axis (the time axis) 20 of the lattice is a symbol period, and the reference numeral 22 on the time axis is a unit for channel coding.

Figure 4:
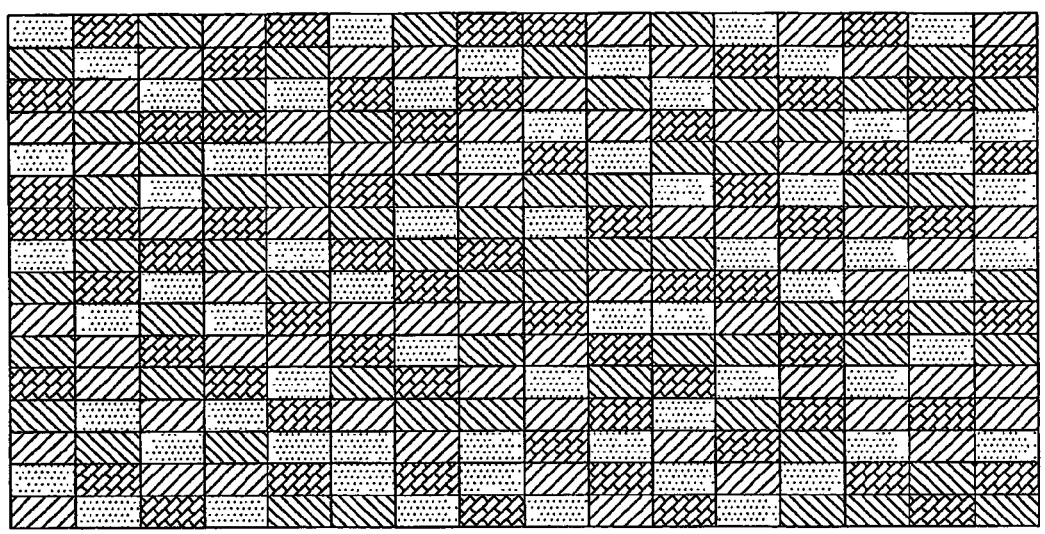
FIG. 4 shows an exemplified case of multiplexing a plurality of channels in a cell in the frequency hopping method of the OFDM system according to a preferred embodiment of the present invention.

FIG. 4 shows an exemplified case of multiplexing a plurality of channels in a cell in the frequency hopping method of the OFDM system according to a preferred embodiment of the present invention.

FIG. 4 is an exemplification of multiplexing four channels, that is, four concurrent users, showing that a user uses four subcarriers matched with the channel a for each symbol period when the user uses the channel a to communicate.

Applying the frequency hopping pattern designing method according to the preferred embodiment to the case of allocating a channel as a group of adjacent subcarriers (a cluster) generates complete interference averaging.

In the configuration of a channel using the cluster, the frequency hopping pattern design method is applied by setting a single cluster as a single subcarrier.

Figure 1A:
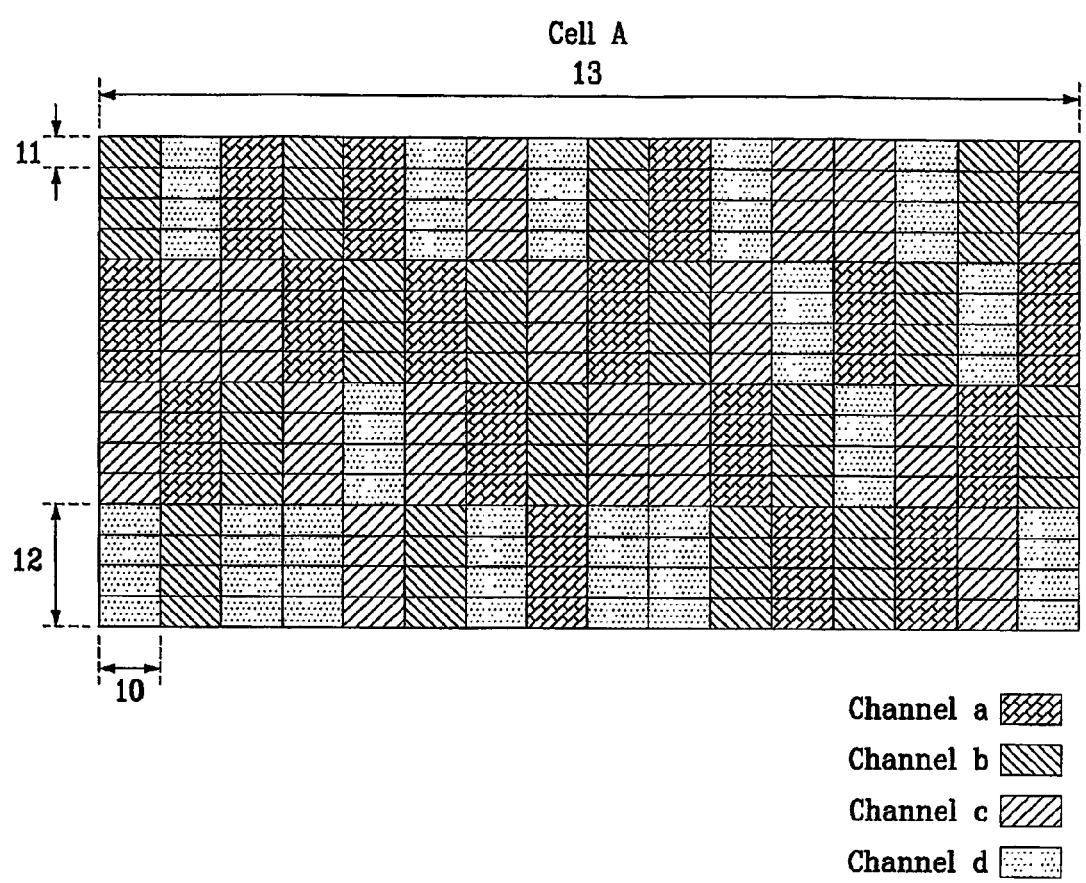
FIGS. 1(a) and 1(b) show diagrams for describing a frequency hopping pattern of subcarriers including clusters according to the conventional OFDMA method.
Figure 1B:
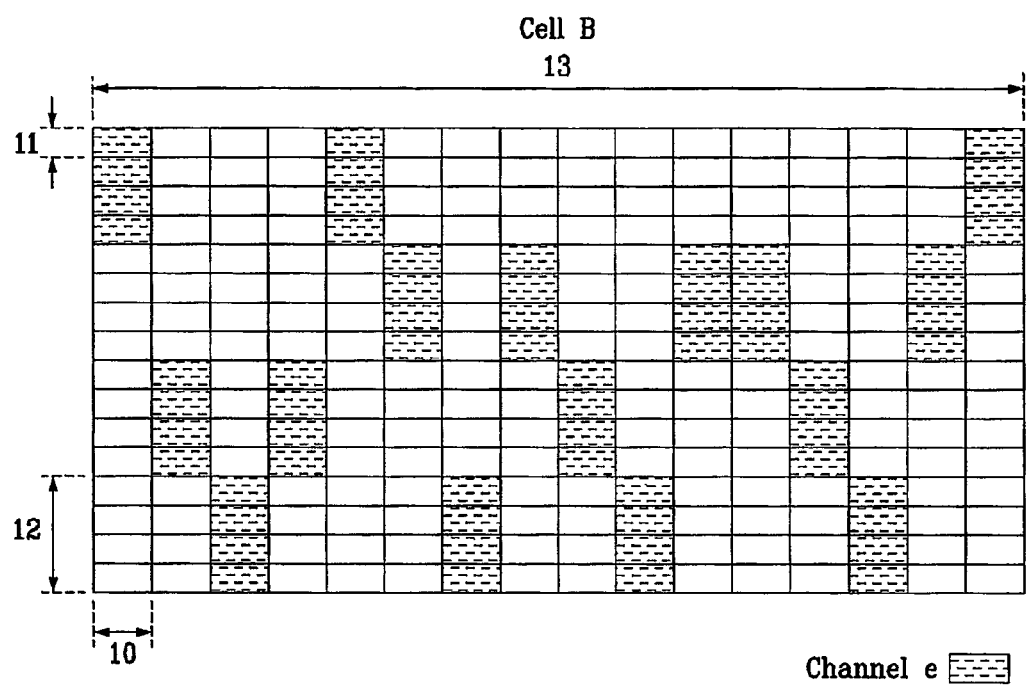

That is, with reference to FIG. 1, four channels (four concurrent users) exist, and a single channel is formed by allocating four adjacent subcarriers (clusters). In this instance, the frequency hopping pattern design method according to the preferred embodiment of the present invention is applied under the consideration that the system has four subcarriers, and a single channel includes a single subcarrier.

Figure 5:
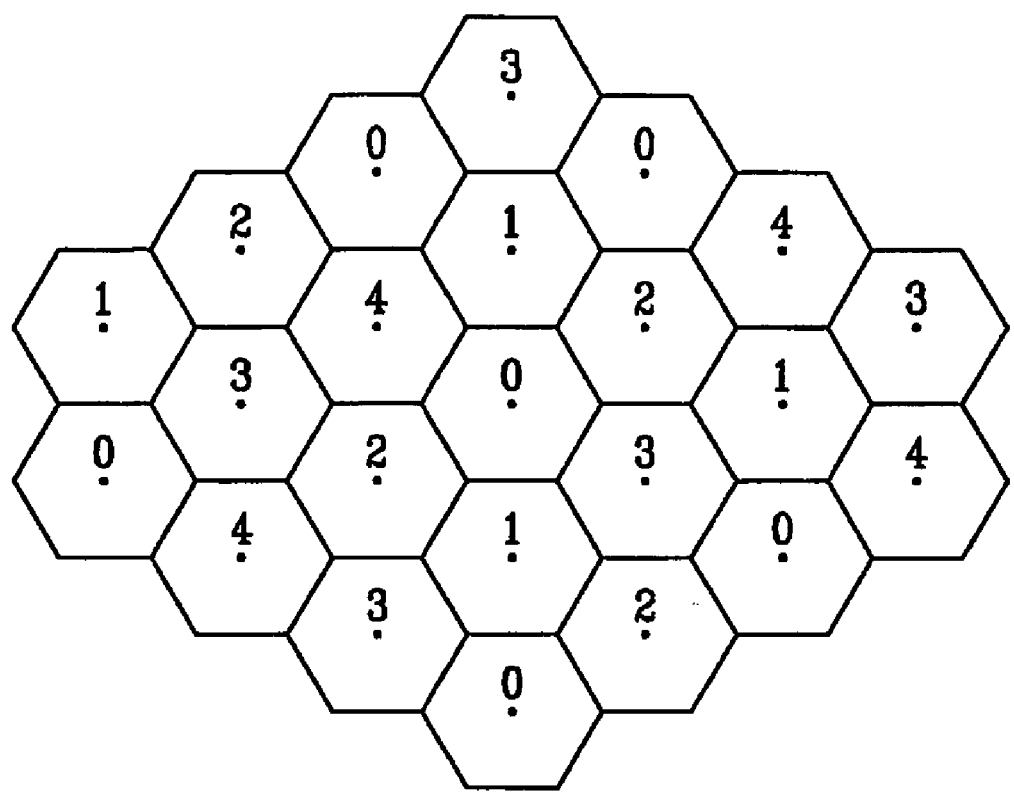
FIG. 5 shows an exemplified frequency hopping pattern layout in a regular hexagonal cellular layout.

FIG. 5 shows an exemplified frequency hopping pattern layout in a regular hexagonal cellular layout.

As shown, five frequency hopping patterns are provided, and two adjacent cells have different frequency hopping patterns in the regular hexagonal cellular layout.

It is required for the two adjacent cells to have different frequency hopping patterns, and it is desirable for two near cells that are not adjacent to be allocated different hopping patterns because the two cells may induce heavy interference with each other, thereby averaging the interference. Also, more frequency hopping patterns are needed so as to apply to a third-dimensional cellular structure having a hierarchical structure.

In the preferred embodiment of the present invention, it is assumed that P different frequency hopping patterns are required.

Symbols for describing the frequency hopping patterns according to the preferred embodiment will now be defined.

T: a number (16 in FIG. 3) of OFDM symbol periods provided in the channel coding unit C: a number of the total subcarriers (16 in FIG. 3)

J: a number of subcarriers forming a single channel (4 in FIG. 3)

N: a number of channels (4 in FIG. 3)

$c_j^{p,n}(t)$: a subcarrier with a number j in the channel n in the symbol interval t, when using a frequency hopping pattern p.

In this instance, t, p, n, and j satisfy the following condition.

$$0 \leq t \leq T-1,\ 0 \leq p \leq P-1,\ 0 \leq n \leq N-1,\ 0 \leq j \leq J-1$$

Following the definition, it is satisfied that C=J×N. When C=16, J=4, and N=4 in FIG. 3, FIG. 3 shows the $0^{th}$ hopping pattern, and when the channel a is the $2^{nd}$ channel, it is satisfied that $c_0^{0,2}(0)=2$, $c_3^{0,2}(4)=14$, and $c_1^{0,2}(7)=2$.

When a frequency hopping pattern $c_j^{p,0}(t)$ of $0^{th}$ channel is given with respect to a specific hopping pattern p, the frequency hopping pattern of other channels (n=1, 2, ..., N−1) is defined as in Equation 1.

$$c_j^{p,n}(t) = N \cdot j + \{(c_j^{p,0}(t)+n) \bmod N\} \qquad \text{Equation 1}$$

In this instance, the integers p, n, j, and t satisfy the following conditions, and P, N, J, and T are the same as those previously described.

$$0 \leq p \leq P-1,\ 1 \leq n \leq N-1,\ 0 \leq j \leq J-1,\ \text{and}\ 0 \leq t \leq T-1.$$

Figure 6:
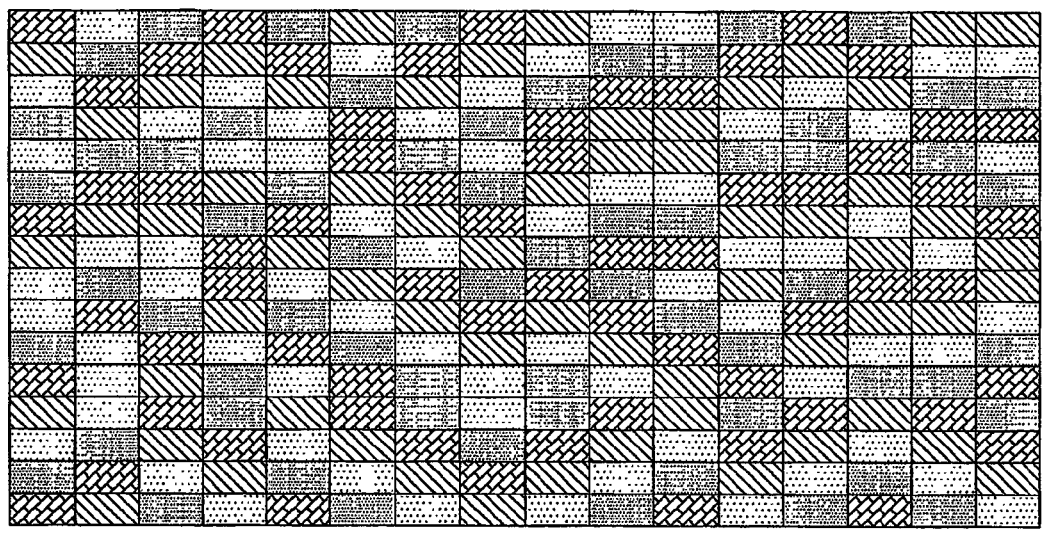
FIG. 6 shows an exemplified case of multiplexing a plurality of channels in a cell in the frequency hopping method of the OFDM system according to a preferred embodiment of the present invention.

FIG. 6 shows an exemplified case of multiplexing a plurality of channels in a cell in the frequency hopping method of the OFDM system according to a preferred embodiment of the present invention, showing a is case of defining other channels as expressed in Equation 1 when the $0^{th}$ channel is given.

The hopping pattern of the $0^{th}$ channel is defined by Equation 2.

$$c_j^{p,0}(t) = N \cdot j + w^p((J \cdot t + j) \bmod K) \qquad \text{Equation 2}$$

In this instance, the integers p, j, and t satisfy the following conditions, and P, N, J, and T are the same as those previously described.

$$0 \leq p \leq P-1,\ 0 \leq j \leq J-1,\ \text{and}\ 0 \leq t \leq T-1.$$

A positive integer K and $w^p(0)$, $w^p(1)$, ..., $w^p(K-1)$ are defined as follows. The hopping sequences of the subcarriers of the respective channels in the frequency hopping pattern p can be obtained only if K and $w^p(\cdot)$ are given according to Equations 1 and 2.

Definitions of K and $w^p(\cdot)$, and a method for finding them, will now be described.

Several cases are provided according to features of the number N of the channels.

(i) When N is a prime number

A prime number is a whole number greater than 1 that cannot be divided exactly by any whole number except itself and the number 1. A plurality of operations and matrixes will be defined in Equations 3 through 5 before defining K and $w^p(\cdot)$.

When matrixes $X \in R^{L \times M}$ and $Y \in R^{I \times M}$ are given, a matrix operator $\oplus$ is defined as follows.

$$X \breve{\oplus} Y = \begin{bmatrix} X_{0,*} + Y_{0,*} \\ X_{0,*} + Y_{1,*} \\ \vdots \\ X_{0,*} + Y_{I-1,*} \\ X_{1,*} + Y_{0,*} \\ X_{1,*} + Y_{1,*} \\ \vdots \\ X_{1,*} + Y_{I-1,*} \\ \vdots \\ X_{L-1,*} + Y_{0,*} \\ X_{L-1,*} + Y_{1,*} \\ \vdots \\ X_{L-1,*} + Y_{I-1,*} \end{bmatrix} \quad \text{Equation 3}$$

Here, $X_{i,\cdot}$ and $Y_{i,\cdot}$ respectively represent the $i^{th}$ row of the matrixes X and Y. Further, the mod operation of the matrix is defined below.

Equation 4

When the matrix $A \in R^{L \times M}$ is given as follows, $$A = \begin{bmatrix} a_{0,0} & a_{0,1} & \cdots & a_{0,M-1} \\ a_{1,0} & a_{1,1} & \cdots & a_{1,M-1} \\ \vdots & \vdots & \ddots & \vdots \\ a_{L-1,0} & a_{L-1,1} & \cdots & a_{L-1,M-1} \end{bmatrix}$$

the matrix A mod $d \in R^{L \times M}$ is defined as follows.

$$A \bmod d = \begin{bmatrix} a_{0,0} \bmod d & a_{0,1} \bmod d & \cdots & a_{0,M-1} \bmod d \\ a_{1,0} \bmod d & a_{1,1} \bmod d & \cdots & a_{1,M-1} \bmod d \\ \vdots & \vdots & \ddots & \vdots \\ a_{L-1,0} \bmod d & a_{L-1,1} \bmod d & \cdots & a_{L-1,M-1} \bmod d \end{bmatrix}$$

where d is a positive integer.

The matrix $B_N$ is defined as in Equation 5 with a given prime number N.

$$B_N \in R^{N \times N} \quad \text{Equation 5}$$

A value at the $i^{th}$ row and $j^{th}$ column in the matrix $B_N$ is defined as $i \times j \bmod N$. In this instance, i and j represent integers between 0 and N−1.

Rewriting the matrix generates:

$$B_N = \begin{bmatrix} 0 \bmod N & 0 \bmod N & \cdots & 0 \bmod N \\ 0 \bmod N & 1 \bmod N & \cdots & (N-1) \bmod N \\ 0 \bmod N & 2 \bmod N & \cdots & 2(N-1) \bmod N \\ \vdots & \vdots & \ddots & \vdots \\ 0 \bmod N & (N-1) \bmod N & \cdots & (N-1)(N-1) \bmod N \end{bmatrix}$$

The integer K which is one of the factors for determining the frequency hopping patterns is found from Equation 6.

Equation 6

When defining an integer q as the least integer that satisfies $P \leq N^q$, it is found that $K = N^q$.

Also, the matrix $F_i$ with respect to the positive integer i is found as in Equation 7.

$F_i = B_N$, and $$F_{i+1} = \{(1'_N \otimes F_i) \breve{\oplus} (B_N \otimes 1'_{N^i})\} \bmod N. \quad \text{Equation 7}$$

where i is a positive integer, and $1_M \in R^{M \times 1}$ is an M-dimensional column vector having the values of all the elements as 1. The matrix operator $\otimes$ represents the Kronecker product.

According to the above-described definition, the matrix $F_q$ is an $N^q \times N^q$ square matrix. When $F_q$ is given, $w^p(\cdot)$ for determining the frequency hopping pattern is defined in Equation 8.

Equation 8

When the integer q is defined as the least integer satisfying $P \leq N^q$, $$w^p(j) = f_{pj}$$

where $f_{pj}$ represents a value at the $p^{th}$ row and $j^{th}$ column in the matrix $F_q$. The integers j and p range from 0 to $N^q - 1$. That is, $0 \leq j, p \leq N^q - 1$.

Since the number of the matrix $F_q$ is $N^q$, the number of the different frequency hopping patterns becomes $N^q$ which is greater than P according to Equation 8. Accordingly, more than 8 frequency hopping patterns can be found according to the above-noted equations.

Figure 7A:
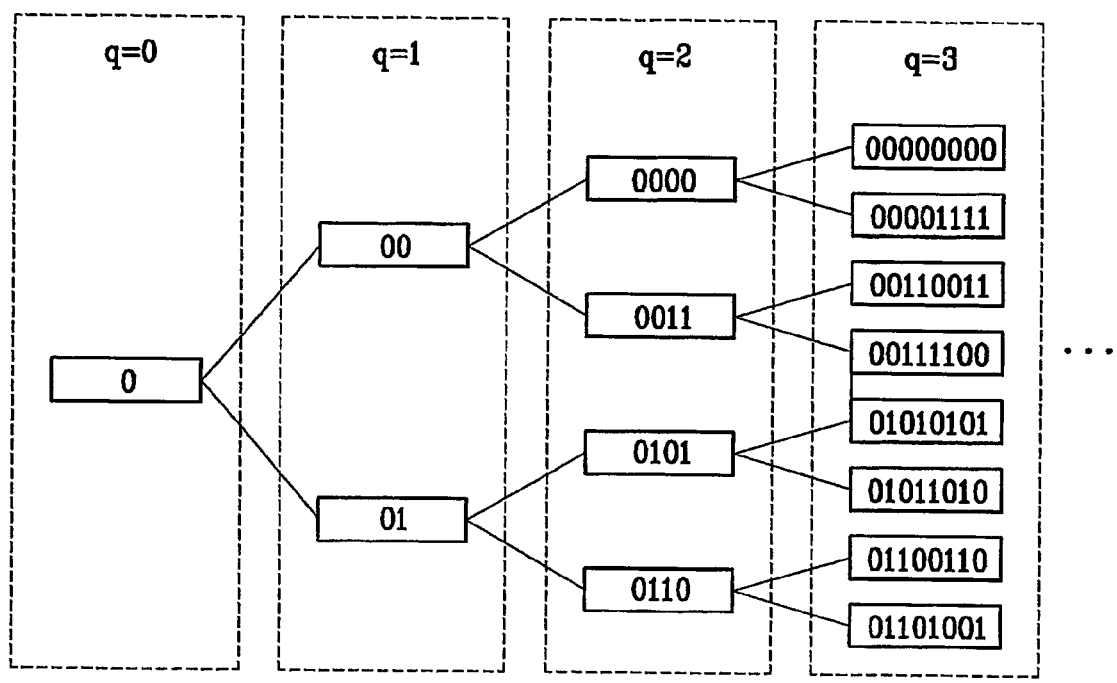
FIGS. 7(a) and 7(b) show exemplified frequency hopping patterns when the number of channels is a prime number in the frequency hopping method of the OFDM system according to a preferred embodiment of the present invention.
Figure 7B:
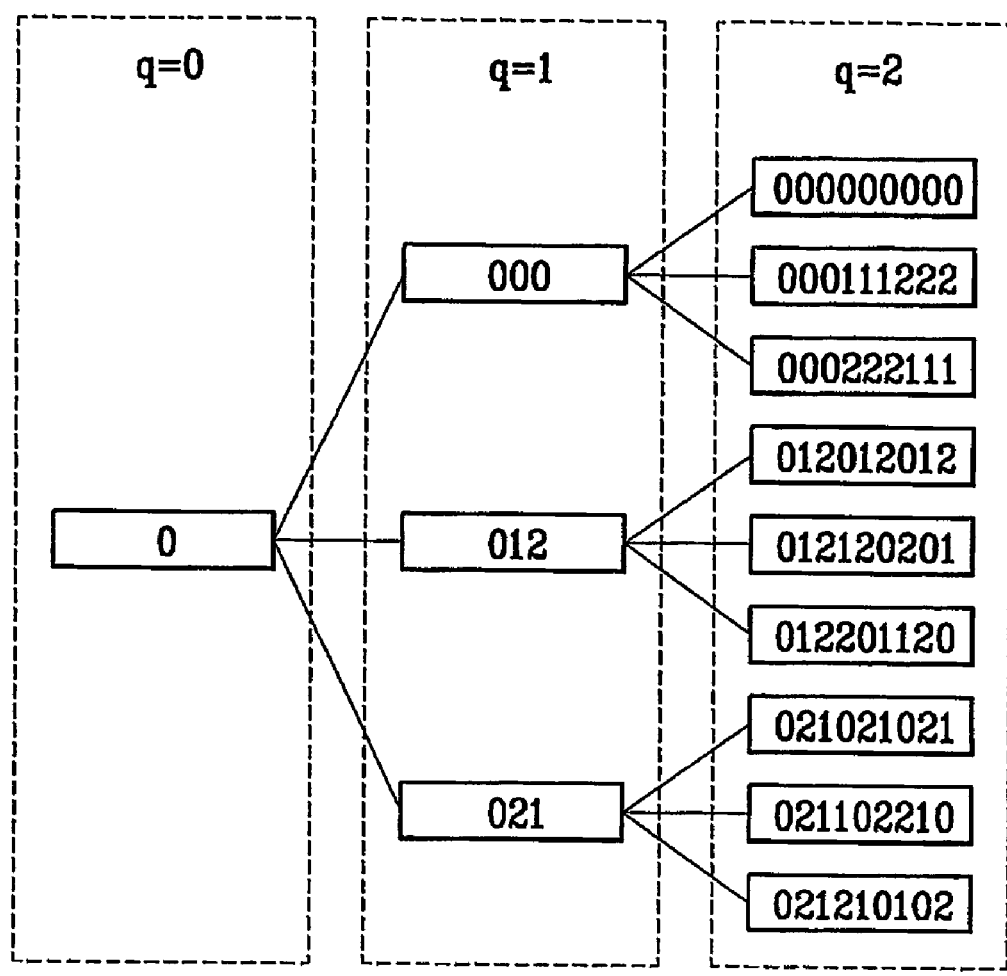

FIGS. 7(a) and 7(b) show exemplified frequency hopping patterns when the number of channels is a prime number in the frequency hopping method of the OFDM system according to a preferred embodiment of the present invention.

FIG. 7(a) shows a first case of the frequency hopping patterns when N=2, and q=0, 1, 2, and 3.

For example, if q=2, the following four frequency hopping patterns are generated.

$(w^0(0), w^0(1), w^0(2), w^0(3)) = (0,0,0,0)$ $(w^1(0), w^1(1), w^1(2), w^1(3)) = (0,0,1,1)$ $(w^2(0), w^2(1), w^2(2), w^2(3)) = (0,1,0,1)$ $(w^3(0), w^3(1), w^3(2), w^3(3)) = (0,1,1,0)$

If 5 through 8 frequency hopping patterns are required, it is needed to use a hopping pattern of q=3, and eight different frequency hopping patterns are generated in this instance.

FIG. 7(b) shows a second case of the frequency hopping patterns when N=3, and q=0, 1, and 2.

When using the above-generated frequency hopping patterns if $J \cdot T | N^q$ is an integer, the collision times between two channels in the different frequency hopping patterns become identical.

Figure 8A:
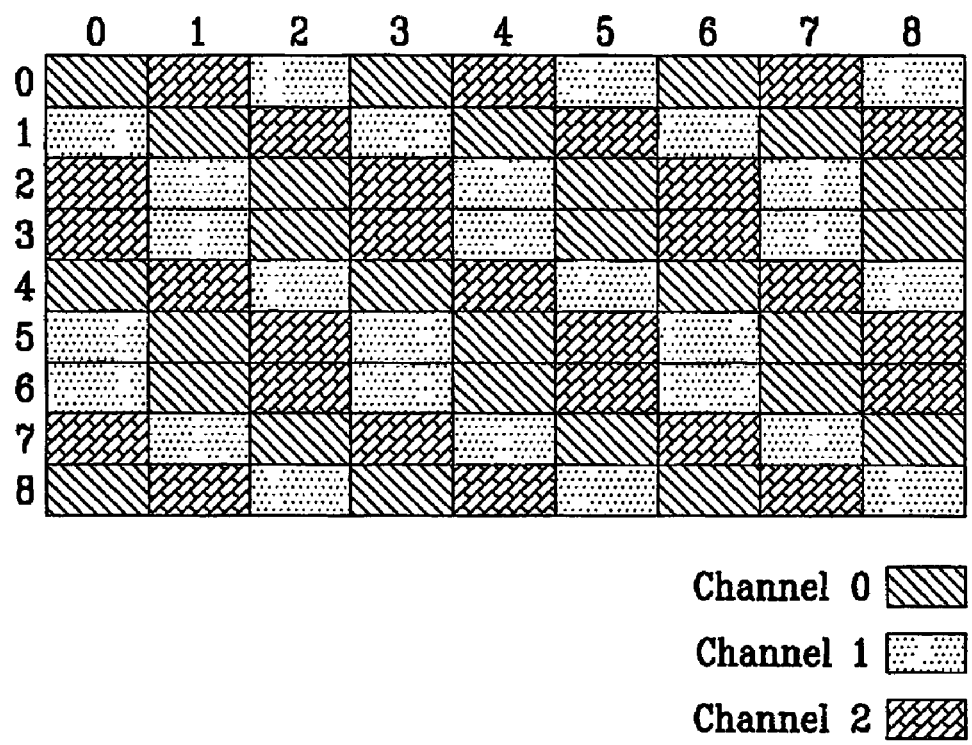
FIGS. 8(a) and 8(b) shows channel layouts generated when applying the frequency hopping pattern to two adjacent cells following the frequency hopping method in the OFDM system according to a preferred embodiment of the present invention.
Figure 8B:
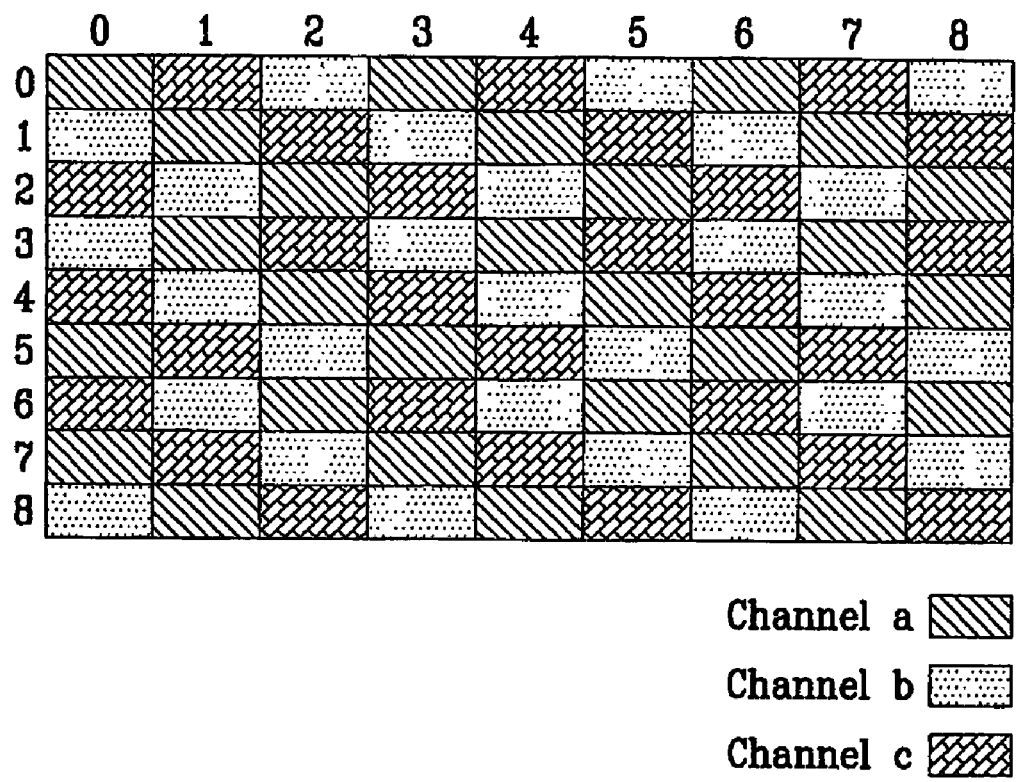

FIGS. 8(a) and 8(b) shows channel layouts generated when applying the frequency hopping pattern following the frequency hopping method in the OFDM system according to a preferred embodiment of the present invention to two adjacent cells, respectively showing frequency hopping states when using the frequency hopping patterns of (012120201) and (021102210) of FIG. 7(b) with N=3, J=3, and T=9.

As shown, the frequency collision times of the two channels are identically 9 when any channel pair of (012120201) and (021102210) is selected.

(ii) When $N=a^x$

Here, a is a prime number, and x is a positive integer. That is, N is represented in the format of the square of a predetermined prime number. The case of (i) is an exceptional case with x=1.

The matrix $C_a^x$ with respect to the given number $N=a^x$ of channels is defined in Equation 9.

$$C_{a^x} 1 \in R^{a \times a^x} \quad \text{Equation 9}$$

The value at the $i^{th}$ row and $j^{th}$ column in the matrix $C_a^x$ is defined as $(i \times j) \bmod a^x$, where $0 \le i \le a-1$ and $0 \le j \le a^x - 1$.

That is, $$C_{a^x} = \begin{bmatrix} 0 \bmod a^x & 0 \bmod a^x & \cdots & 0 \bmod a^x \\ 0 \bmod a^x & 1 \bmod a^x & \cdots & (a^x-1) \bmod a^x \\ 0 \bmod a^x & 2 \bmod a^x & \cdots & 2(a^x-1) \bmod a^x \\ \vdots & \vdots & \ddots & \vdots \\ 0 \bmod a^x & (a-1) \bmod a^x & \cdots & (a-1)(a^x-1) \bmod a^x \end{bmatrix}$$

where the integer K which is one of the factors for determining the frequency hopping patterns is found from Equation 10.

Equation 10

When the integer q is defined as the least integer satisfying $P \le a^q$, it is found that $K = N \cdot a^{q-1}$.

Also, the matrix $F_i$ with respect to a positive integer i is defined as in Equation 11.

$$F_1 = C_a^x \text{ and}$$

$$F_{i+1} = \{(1'_a \otimes F_i) \breve{\otimes} (C_a^x \otimes 1'_a{}^i)\} \bmod N \quad \text{Equation 11}$$

where i is a positive integer, and $1_M \in R^{M \times 1}$ is an M-dimensional column vector having values of all the element as 1, and the matrix operator $\otimes$ represents the Kronecker product.

According to the above equations, the matrix $F_q$ is an $(a^q) \times (N \cdot a^{q-1})$-dimensional matrix.

When $F_q$ is given, $w^p(\cdot)$ for determining the frequency hopping pattern is found using Equation 12.

Equation 12

When defining the integer q as the least integer satisfying $P \le a^q$, it is found that $w^p(j) = f_{pj}$ where $f_{pj}$ represents a value at the $p^{th}$ row and $j^{th}$ column in the matrix $F_q$, and $0 \le p \le a^q - 1$ and $0 \le j \le N \cdot a^{q-1} 1$.

Since the number of the matrix $F_q$ is $a^q$, the number of the different frequency hopping patterns becomes $a^q$ which is greater than P because of Equation 12. Accordingly, the frequency hopping patterns of more than P frequency hopping patterns can be obtained using the equations.

Figure 9:
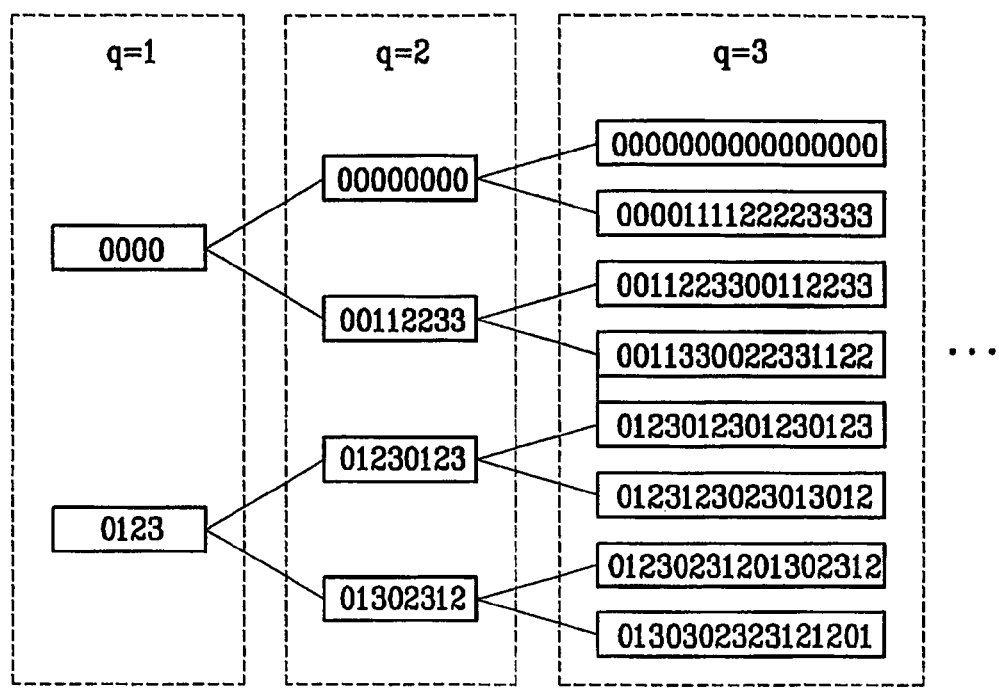
FIG. 9 shows an exemplified frequency hopping pattern when the number of channels is the square of a prime number in the frequency hopping method of the OFDM system according to a preferred embodiment of the present invention.

FIG. 9 shows an exemplified frequency hopping pattern when the number of channels is the square of a prime number in the frequency hopping method of the OFDM system according to a preferred embodiment of the present invention, that is, when N=4.

$$(iii) \text{ When } N = \prod_{z=0}^{Z-1} a_z^{x_z}.$$

$a_z$ is a prime number, and $x_z$ is a positive integer for all z that satisfies $0 \le z \le Z-1$.

The integer K which is one of the factors that determine the frequency hopping pattern is found from Equation 13.

$$K = \prod_{z=0}^{Z-1} a_i^{x_i} a^{q_i-1} = N \prod_{z=0}^{Z-1} a^{q_i-1} \quad \text{Equation 13}$$

for z satisfying $0 \le z \le Z-1$ where $q_z$ is the least integer satisfying $P \le a_z^{q_z}$.

The matrixes $F_i^z$ and $\overline{F}_z$ are defined as in Equation 14 for all positive integers i, and z that satisfies $0 \le z \le Z-1$.

$$F_{i+1}^z = \{(1'_{a_z} \otimes F_i^z) \breve{\otimes} (C_{a_x^x} \otimes 1'_{a_z^i})\} \bmod a_z^{x_z} \quad \text{Equation 14}$$

when $F_1^z = C_{a_x^x}$, where $C_M$ is predefined in Equation 9.

Also, when $q_z$ is defined as the least integer that satisfies $P \le a_z^{q_z}$, $\overline{F}_z$ is defined as a matrix generated by randomly selecting P rows in the matrix $F_{q_x}^z$.

Let the matrix $G_z$ be defined for z that is not a negative integer from the above-noted equations.

$$G_x = \left[ \left\{ \left( \prod_{i=0}^{z-1} a_i^{x_i} \right) \overline{F}_z \right\} \breve{\odot} G_{z-1} \right] \bmod \prod_{i=0}^{z} a_i^{x_i} \quad \text{Equation 15}$$

for z satisfying $1 \le z \le Z-1$, when $G_0 = \overline{F}_0$. In this instance, the matrix operator $\breve{\odot}$ is defined as follows.

$$A \breve{\odot} B = \begin{bmatrix} a_{0,0} 1'_m + B_{0,*} & a_{0,1} 1'_m + B_{0,*} & \cdots & a_{0,M-1} 1'_m + B_{0,*} \\ a_{1,0} 1'_m + B_{1,*} & a_{1,1} 1'_m + B_{1,*} & \cdots & a_{1,M-1} 1'_m + B_{1,*} \\ \vdots & \vdots & \ddots & \vdots \\ a_{L-1,0} 1'_m + B_{L-1,*} & a_{L-1,0} 1'_m + B_{L-1,*} & \cdots & a_{L-1,0} 1'_m + B_{L-1,*} \end{bmatrix}$$

when the matrixes $A \in R^{L \times M}$ and $B \in R^{L \times m}$ are provided.

Given $G_{Z-1}$, $w^p(\cdot)$ for determining the frequency hopping pattern is found from Equation 16.

$$w^p(j) = g_{pj} \quad \text{Equation 16}$$

where $g_{pj}$ is a value at the $p^{th}$ row and $j^{th}$ column in the matrix $G_{Z-1}$, and $0 \le p \le P-1$ and $$0 \le j \le \prod_{z=0}^{z-1} a_z^{x_z} a^{q_z-1} - 1.$$

In this instance, $q_z$ is the least integer satisfying $P \le a_z^{q_x}$. Also, z is an integer satisfying $1 \le z \le Z-1$.

Since the row number of the matrix $G_{Z-1}$ is P, the number of the different frequency hopping patterns becomes P. Tables 1, 2, and 3 are exemplifications of $g_{pj}$ when N=2×3=6.

TABLE 1

| Pattern | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| p = 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| p = 1 | 0 | 0 | 0 | 1 | 1 | 1 | 2 | 2 | 2 | 0 | 0 | 0 | 1 | 1 | 1 | 2 | 2 | 2 | 0 | 0 | 0 | 1 | 1 | 1 |
| p = 2 | 0 | 0 | 0 | 2 | 2 | 2 | 1 | 1 | 1 | 0 | 0 | 0 | 2 | 2 | 2 | 1 | 1 | 1 | 3 | 3 | 3 | 5 | 5 | 5 |
| p = 3 | 0 | 1 | 2 | 0 | 1 | 2 | 0 | 1 | 2 | 0 | 1 | 2 | 0 | 1 | 2 | 0 | 1 | 2 | 3 | 4 | 5 | 3 | 4 | 5 |
| p = 4 | 0 | 1 | 2 | 1 | 2 | 0 | 2 | 0 | 1 | 3 | 4 | 5 | 4 | 5 | 3 | 5 | 3 | 4 | 0 | 1 | 2 | 1 | 2 | 0 |
| p = 5 | 0 | 1 | 2 | 2 | 0 | 1 | 1 | 2 | 0 | 3 | 4 | 5 | 5 | 3 | 4 | 4 | 5 | 3 | 0 | 1 | 2 | 2 | 0 | 1 |
| p = 6 | 0 | 2 | 1 | 0 | 2 | 1 | 0 | 2 | 1 | 3 | 5 | 4 | 3 | 5 | 4 | 3 | 5 | 4 | 3 | 5 | 4 | 3 | 5 | 4 |
| p = 7 | 0 | 2 | 1 | 1 | 0 | 2 | 2 | 1 | 0 | 3 | 5 | 4 | 4 | 3 | 5 | 5 | 4 | 3 | 3 | 5 | 4 | 4 | 3 | 5 |

TABLE 2

| Pattern | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|---|---|---|---|---|
| p = 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| p = 1 | 2 | 2 | 2 | 0 | 0 | 0 | 1 | 1 | 1 | 2 | 2 | 2 | 3 | 3 | 3 | 4 | 4 | 4 | 5 | 5 | 5 | 3 | 3 | 3 |
| p = 2 | 4 | 4 | 4 | 3 | 3 | 3 | 5 | 5 | 5 | 4 | 4 | 4 | 0 | 0 | 0 | 2 | 2 | 2 | 1 | 1 | 1 | 0 | 0 | 0 |
| p = 3 | 3 | 4 | 5 | 3 | 4 | 5 | 3 | 4 | 5 | 3 | 4 | 5 | 3 | 4 | 5 | 3 | 4 | 5 | 3 | 4 | 5 | 3 | 4 | 5 |
| p = 4 | 2 | 0 | 1 | 3 | 4 | 5 | 4 | 5 | 3 | 5 | 3 | 4 | 0 | 1 | 2 | 1 | 2 | 0 | 2 | 0 | 1 | 3 | 4 | 5 |
| p = 5 | 1 | 2 | 0 | 3 | 4 | 5 | 5 | 3 | 4 | 4 | 5 | 3 | 3 | 4 | 5 | 5 | 3 | 4 | 4 | 5 | 3 | 0 | 1 | 2 |
| p = 6 | 3 | 5 | 4 | 0 | 2 | 1 | 0 | 2 | 1 | 0 | 2 | 1 | 0 | 2 | 1 | 0 | 2 | 1 | 0 | 2 | 1 | 3 | 5 | 4 |
| p = 7 | 5 | 4 | 3 | 0 | 2 | 1 | 1 | 0 | 2 | 2 | 1 | 0 | 3 | 5 | 4 | 4 | 3 | 5 | 5 | 4 | 3 | 0 | 2 | 1 |

TABLE 3

| Pattern | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
|---|---|---|---|---|---|---|---|---|---|---|---|---|---|---|---|---|---|---|---|---|---|---|---|---|
| p = 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| p = 1 | 4 | 4 | 4 | 5 | 5 | 5 | 3 | 3 | 3 | 4 | 4 | 4 | 5 | 5 | 5 | 3 | 3 | 3 | 4 | 4 | 4 | 5 | 5 | 5 |
| p = 2 | 2 | 2 | 2 | 1 | 1 | 1 | 3 | 3 | 3 | 5 | 5 | 5 | 4 | 4 | 4 | 3 | 3 | 3 | 5 | 5 | 5 | 4 | 4 | 4 |
| p = 3 | 3 | 4 | 5 | 3 | 4 | 5 | 0 | 1 | 2 | 0 | 1 | 2 | 0 | 1 | 2 | 0 | 1 | 2 | 0 | 1 | 2 | 0 | 1 | 2 |
| p = 4 | 4 | 5 | 3 | 5 | 3 | 4 | 0 | 1 | 2 | 1 | 2 | 0 | 2 | 0 | 1 | 3 | 4 | 5 | 4 | 5 | 3 | 5 | 3 | 4 |
| p = 5 | 2 | 0 | 1 | 1 | 2 | 0 | 3 | 4 | 5 | 5 | 3 | 4 | 4 | 5 | 3 | 0 | 1 | 2 | 2 | 0 | 1 | 1 | 2 | 0 |
| p = 6 | 3 | 5 | 4 | 3 | 5 | 4 | 3 | 5 | 4 | 3 | 5 | 4 | 3 | 5 | 4 | 0 | 2 | 1 | 0 | 2 | 1 | 0 | 2 | 1 |
| p = 7 | 1 | 0 | 2 | 2 | 1 | 0 | 0 | 2 | 1 | 1 | 0 | 2 | 2 | 1 | 0 | 3 | 5 | 4 | 4 | 3 | 5 | 5 | 4 | 3 |

The frequency hopping method in the OFDM system according to the preferred embodiment of the present invention allows complete interference averaging because of uniform degrees of interference between the channels in two cells, enables designing of different frequency hopping patterns of as many as a desired number when the number of channels (the number N of concurrent users) is small, and executes complete interference averaging and designs the different frequency hopping patterns of as many as a desired number when the number of channels N has at least two different prime numbers as divisors.

While this invention has been described in connection with what is presently considered to be-the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A frequency hopping method in an OFDM (orthogonal frequency division multiplexing) system, comprising:

(a) detecting a mutual interference degree between different cells, and determining whether to use a different frequency hopping pattern for each of the different cells for interference averaging according to the mutual interference degree;

(b) determining a number P of the different frequency hopping patterns needed for satisfying the results of (a) between all the cells in the system;

(c) generating the frequency hopping patterns of at least the number P determined in (b), and allocating one of the generated frequency hopping patterns to each cell in the system so as to satisfy the results of (a), wherein each frequency hopping pattern defines a hopping sequence for each channel within the corresponding cell, and subchannels of each channel hop with respect to time according to the hopping sequence, and wherein the frequency hopping patterns are generated such that a number of frequency collisions between two channels making up a channel pair in two different frequency hopping patterns is the same for each channel pair in the two different frequency hopping patterns; and (d) frequency-hopping the channels in each cell according to the frequency hopping pattern allocated in (c).

2. The method of claim 1, wherein generating the frequency hopping patterns in (c) comprises setting a cluster as a subcarrier to thereby generate the frequency hopping patterns, when the channel includes a cluster.

3. The method of claim 1, wherein generating the frequency hopping patterns in (c) comprises generating the different frequency hopping patterns of more than the number P using the following equations, when the number (the number N of concurrent users) of channels is a prime number:

(i) $B_N \in R^{N \times N}$ for a prime number N, and a value at the $i^{th}$ row and $j^{th}$ column in the matrix $B_N$ is defined as $i \times j \mod N$, and i and j represent integers between 0 and N−1;

(ii) when defining an integer q as the least integer that satisfies $P \leq N^q$, it is found that $K = N^q$;

(iii) $F_1 = B_N$, and $F_{i+1} = \{(1'_N \otimes F_i) \oplus (B_N \otimes 1'_{N'})\} \mod N$ and for a positive integer i, and $1_M \in R^{M \times 1}$ is an M-dimensional column vector having the values of all the elements as 1, and the matrix operator $\otimes$ represents the Kronecker product, and when matrixes $X \in R^{L \times M}$ and $Y \in R^{l \times M}$ are given, the matrix operator $\oplus$ is defined by $$X \check{\oplus} Y = \begin{bmatrix} X_{0,*} + Y_{0,*} \\ X_{0,*} + Y_{1,*} \\ \vdots \\ X_{0,*} + Y_{l-1,*} \\ X_{1,*} + Y_{0,*} \\ X_{1,*} + Y_{1,*} \\ \vdots \\ X_{1,*} + Y_{l-1,*} \\ \vdots \\ X_{L-1,*} + Y_{0,*} \\ X_{L-1,*} + Y_{1,*} \\ \vdots \\ X_{L-1,*} + Y_{l-1,*} \end{bmatrix}$$

where $X_{i,\cdot}$ and $Y_{i,\cdot}$ respectively represent the $i^{th}$ row of the matrixes X and Y;

(iv) when the integer q is defined as the least integer satisfying $P \leq N^q$, $w^p(j) = f_{pj}$ where $f_{pj}$ represents a value at the $p^{th}$ row and $j^{th}$ column in the matrix $F_q$, and the integers j and p range from 0 to $N^q - 1$, that is, $0 \leq j, p \leq N^q - 1$; and (v) when $c_j^{p,n}(t)$ is a $j^{th}$ subcarrier in the $n^{th}$ channel of the $p^{th}$ frequency hopping pattern in the $t^{th}$ symbol interval, it is defined that $c_j^{p,0}(t) = N \cdot j + w^p((J \cdot t + j) \mod K)$ $c_j^{p,n}(t) = N \cdot j + \{(c_j^{p,0}(t) + n) \mod N\}$, and in this instance, t, p, n, and j satisfy the conditions $0 \leq t \leq T-1$, $0 \leq p \leq P-1$, $0 \leq n \leq N-1$, $0 \leq j \leq J-1$, and T is a number of symbol periods provided in the channel coding unit, and J is a number of subcarriers forming a single channel.

4. The method of claim 1, wherein generating the frequency hopping patterns in (c) comprises generating the different frequency hopping patterns of more than the number P using the following equations, when the number (the number N of concurrent users) of channels is the square of a prime number ($N = a^x$, a is a prime number, and x is a positive integer):

(i) it is defined that $C_a{}^x \in R^{a \times a^x}$, and a value at the $i^{th}$ row and $j^{th}$ column in the matrix $C_\alpha{}^x$ is defined as $(i \times j) \mod a^x$ where $0 \leq i \leq a-1$ and $0 \leq j \leq a^x - 1$;

(ii) when the integer q is defined as the least integer satisfying $P \leq a^q$, it is found that $K = N \cdot a^{q-1}$;

(iii) it is defined that $F_1 = C_\alpha{}^x$, and $F_{i+1} = \{(1'_\alpha \otimes F_i) \otimes (C_\alpha{}^x \otimes 1'_\alpha{}^1)\} \mod N$ where i is a positive integer, and $1_M \in R^{M \times 1}$ is an M-dimensional column vector having values of all the elements as 1, and the matrix operator $\otimes$ represents the Kronecker product, and when matrixes $X \in R^{L \times M}$ and $Y \in R^{l \times M}$ are given, the matrix operator $\oplus$ is defined by $$X \check{\oplus} Y = \begin{bmatrix} X_{0,*} + Y_{0,*} \\ X_{0,*} + Y_{1,*} \\ \vdots \\ X_{0,*} + Y_{l-1,*} \\ X_{1,*} + Y_{0,*} \\ X_{1,*} + Y_{1,*} \\ \vdots \\ X_{1,*} + Y_{l-1,*} \\ \vdots \\ X_{L-1,*} + Y_{0,*} \\ X_{L-1,*} + Y_{1,*} \\ \vdots \\ X_{L-1,*} + Y_{l-1,*} \end{bmatrix}$$

where $X_{i,\cdot}$ and $Y_{i,\cdot}$ respectively represent the $i^{th}$ row of the matrixes X and Y;

(iv) when defining the integer q as the least integer satisfying $P \leq a^q$, it is found that $w^p(j) = f_{pj}$ where $f_{pj}$ represents a value at the $p^{th}$ row and $j^{th}$ column in the matrix $F_q$, and $0 \leq p \leq a^q - 1$ and $0 \leq j \leq N \cdot a^{q-1} - 1$; and (v) when $c_j^{p,n}(t)$ is a $j^{th}$ subcarrier in the $n^{th}$ channel of the $p^{th}$ frequency hopping pattern in the $t^{th}$ symbol interval, it is defined that $c_j^{p,0}(t) = N \cdot j + w^p((J \cdot t + j) \mod K)$ $c_j^{p,n}(t) = N \cdot j + \{(c_j^{p,0}(t) + n) \mod n\}$, and in this instance, t, p, n, and j satisfy the conditions $0 \leq t \leq T-1$, $0 \leq p \leq P-1$, $0 \leq n \leq N-1$, $0 \leq j \leq J-1$, and T is a number of symbol periods provided in the channel coding unit, and J is a number of subcarriers forming a single channel.

5. The method of claim 1, wherein generating the frequency hopping patterns in (c) comprises generating the different frequency hopping patterns of more than the number P using the following equations, when the number (the number N of concurrent users) of channels has at least two different prime numbers as divisors $$\left( N = \prod_{i=0}^{Z-1} a_i^{x_i}, \right.$$

$a_z$ is a prime number, and $x_i$ is a positive integer, and Z is equal to or greater than 2):

(i) it is defined that $$K = \prod_{i=0}^{Z-1} a_i^{x_i} a^{q_i-1} = N \prod_{i=0}^{Z-1} a^{q_i-1}$$

for z satisfying $0 \leq z \leq Z-1$ where $q_z$ is the least integer satisfying $P \leq \alpha_z^{q_z}$:

(ii) given $F_1^z = C_{\alpha_z^{x_z}}$ for all positive integers i and z satisfying $0 \leq z \leq Z-1$, it is defined that $F_{i+1}^z = \{(1'_{\alpha_z^{x_z}} \otimes F_i^z) \check{x} (C_{\alpha_z^{x_z}} \otimes 1'_{\alpha_z^i})\} \bmod \alpha_z^{x_z}$, $C_{\alpha_z^z} \in R^{a \times \alpha^x}$, a value at the $i^{th}$ row and $j^{th}$ column in the matrix $C_{\alpha}^x$ is defined as $(i \times j) \bmod a^x$ where $0 \leq i \leq a-1$ and $0 \leq j \leq a^x-1$, and when $q_z$ is defined as the least integer that satisfies $P \leq \alpha_z^{q_z}$, $\overline{F}_z$ is defined as a matrix generated by randomly selecting P rows in the matrix $F_{q_z}^z$, and the matrix operator $\oplus$ represents the Kronecker product, and when matrixes $X \in R^{L \times M}$ and $Y \in R^{l \times M}$ are given, the matrix operator $\oplus$ is defined by $$X \check{\oplus} Y = \begin{bmatrix} X_{0,*} + Y_{0,*} \\ X_{0,*} + Y_{1,*} \\ \vdots \\ X_{0,*} + Y_{l-1,*} \\ X_{1,*} + Y_{0,*} \\ X_{1,*} + Y_{1,*} \\ \vdots \\ X_{1,*} + Y_{l-1,*} \\ \vdots \\ X_{L-1,*} + Y_{0,*} \\ X_{L-1,*} + Y_{1,*} \\ \vdots \\ X_{L-1,*} + Y_{l-1,*} \end{bmatrix}$$

where $X_{i,\cdot}$ and $Y_{i,\cdot}$ respectively represent the $i^{th}$ row of the matrixes X and Y;

(iii) it is defined that $$G_z = \left[ \left\{ \left( \prod_{i=0}^{z-1} a_i^{x_i} \right) \overline{F}_z \right\} \check{\odot} G_{z-1} \right] \bmod \prod_{i=0}^{z} a_i^{x_i}$$

for z satisfying $1 \leq z \leq Z-1$, when $G_0 = \overline{F}_0$, and in this instance, the matrix operator $\check{\odot}$ is defined by $$A \check{\odot} B = \begin{bmatrix} a_{0,0} 1_m^t + B_{0,*} & a_{0,1} 1_m^t + B_{0,*} & \cdots & a_{0,M-1} 1_m^t + B_{0,*} \\ a_{1,0} 1_m^t + B_{1,*} & a_{1,1} 1_m^t + B_{1,*} & \cdots & a_{1,M-1} 1_m^t + B_{1,*} \\ \vdots & \vdots & \ddots & \vdots \\ a_{L-1,0} 1_m^t + B_{L-1,*} & a_{L-1,0} 1_m^t + B_{L-1,*} & \cdots & a_{L-1,0} 1_m^t + B_{L-1,*} \end{bmatrix}$$

when the matrixes $A \in R^{L \times M}$ and $B \in R^{L \times m}$ are provided;

(iv) it is given that $w^p(j) = g_{pj}$
where $g_{pj}$ is a value at the $p^{th}$ row and $j^{th}$ column in the matrix $G_{Z-1}$, and $0 \leq p \leq P-1$ and $$0 \leq j \leq \prod_{z=0}^{Z-1} a_z^{x_z} a^{q_z-1} - 1,$$

and in this instance, $q_z$ is the least integer satisfying $P \leq \alpha_z^{q_z}$, while z is an integer satisfying $1 \leq z \leq Z-1$; and (v) when $c_j^{p,n}(t)$ is a $j^{th}$ subcarrier in the $n^{th}$ channel of the $p^{th}$ frequency hopping pattern in the $t^{th}$ symbol interval, it is defined that $c_j^{p,0}(t) = N \cdot j + w^p((J \cdot t + j) \bmod K)$ $c_j^{p,n}(t) = N \cdot j + \{(c_j^{p,0}(t) + n) \bmod N\}$, and in this instance, t, p, n, and j satisfy the conditions $0 \leq t \leq T-1$, $0 \leq p \leq P-1$, $0 \leq n \leq N-1$, $0 \leq j \leq J-1$, and T is a number of symbol periods provided in the channel coding unit, and J is a number of subcarriers forming a single channel.

* * * * *